United States Patent [19]

Bezin

[11] Patent Number: 4,811,626
[45] Date of Patent: Mar. 14, 1989

[54] BICYCLE PEDAL CRANK

[76] Inventor: Michel Bezin, 42bis, Boulevard Victor-Hugo, 58000 Nevers, France

[21] Appl. No.: 111,934

[22] Filed: Oct. 23, 1987

[30] Foreign Application Priority Data

Oct. 31, 1986 [FR] France ............................... 86 15180
May 6, 1987 [FR] France ............................... 87 06374

[51] Int. Cl.⁴ ............................................. G05G 1/14
[52] U.S. Cl. ................................................ 74/594.1
[58] Field of Search ........................... 74/594.1–594.5, 74/579 R, 579 E, 579 F

[56] References Cited

U.S. PATENT DOCUMENTS

| 385,717 | 7/1888 | Kibbe | 74/594.1 |
| 626,630 | 6/1889 | Peerstone | 74/594.1 |
| 628,173 | 7/1899 | Young | 74/594.1 |
| 2,350,468 | 6/1944 | Kraeft . | |

FOREIGN PATENT DOCUMENTS

| 0127553 | 12/1984 | European Pat. Off. . | |
| 417313 | 11/1910 | France . | |
| 981600 | 5/1951 | France | 74/594.1 |
| 980071 | 5/1951 | France | 74/594.1 |
| 981379 | 5/1951 | France . | |
| 990700 | 9/1951 | France . | |
| 2416829 | 9/1979 | France | 74/594.1 |
| 2515602 | 5/1983 | France | 74/594.1 |
| 26220 | of 1899 | United Kingdom | 74/594.1 |
| 22058 | of 1901 | United Kingdom | 74/594.1 |

Primary Examiner—Richard E. Moore
Assistant Examiner—Vinh Luong
Attorney, Agent, or Firm—Young & Thompson

[57] ABSTRACT

A bicycle pedal crank is formed by three separate interassembled elements, namely a crank arm and two end-pieces. The crank arm consists of an element of composite material formed by overmolding of a synthetic resin on a tubular core of reinforcement fibers such as carbon fibers or aramide fibers. The end-pieces are manufactured separately and form respectively the crank hub and an end-piece for receiving the corresponding pedal spindle. The two end-pieces each have a tenon which is forcibly engaged and fixed within the corresponding end of the tubular element which forms the crank arm.

3 Claims, 4 Drawing Sheets

Fig. 1
Fig. 2
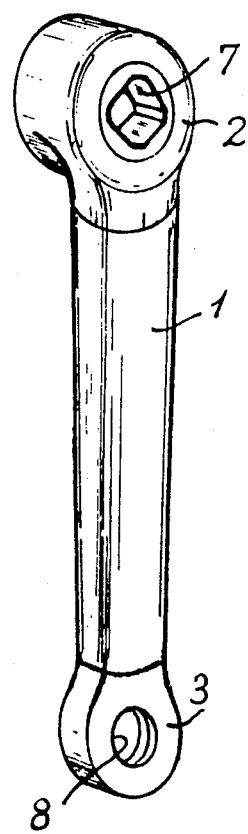
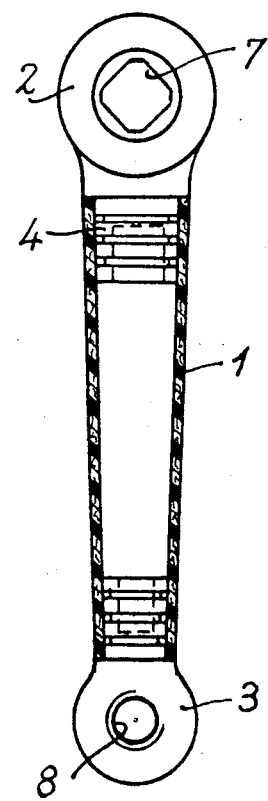
Fig. 4
Fig. 3
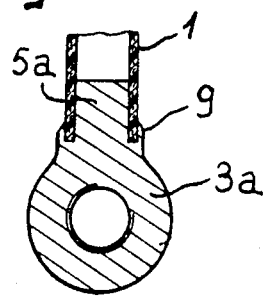
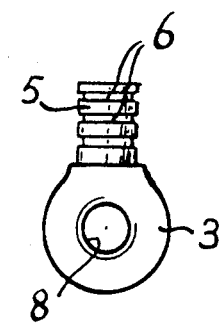

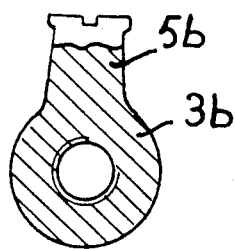
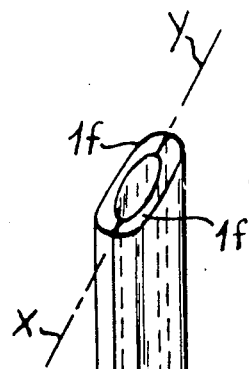
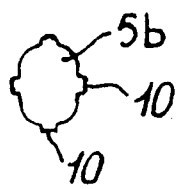
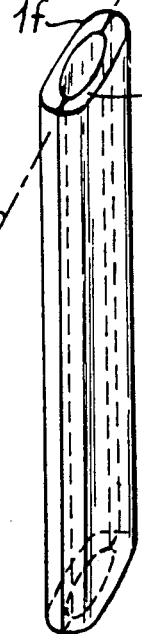
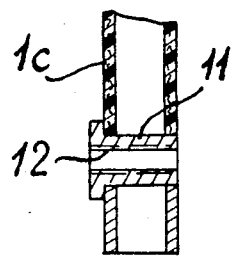
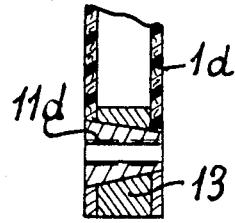
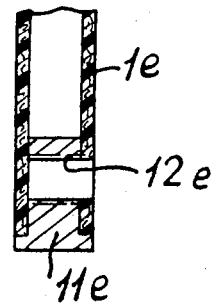

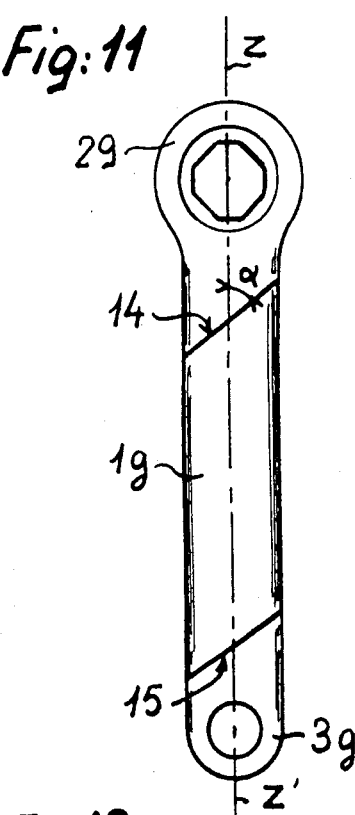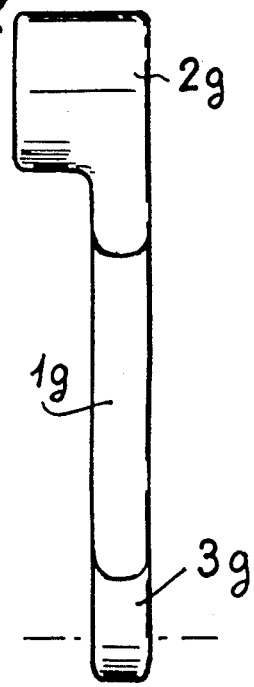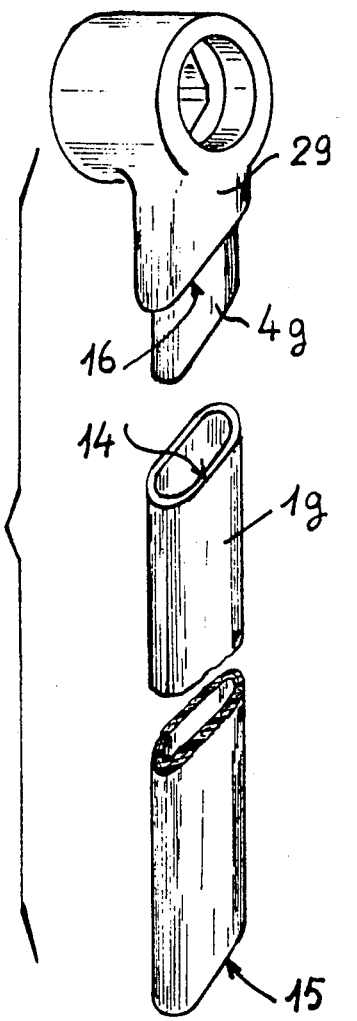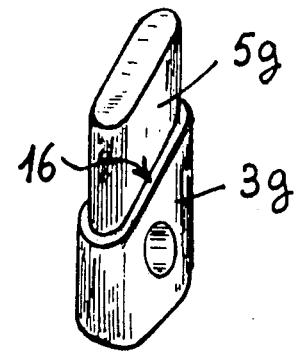

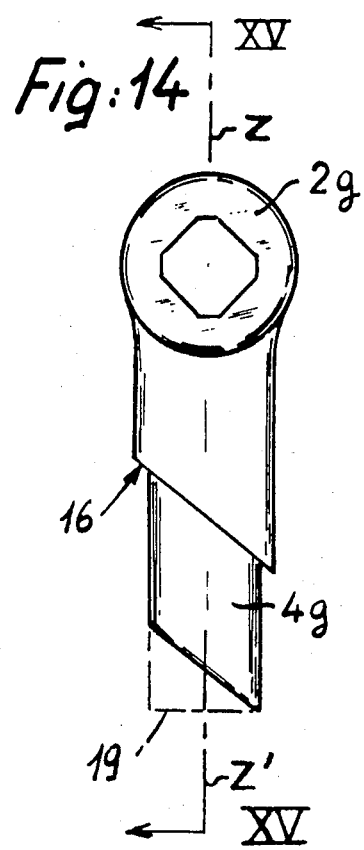
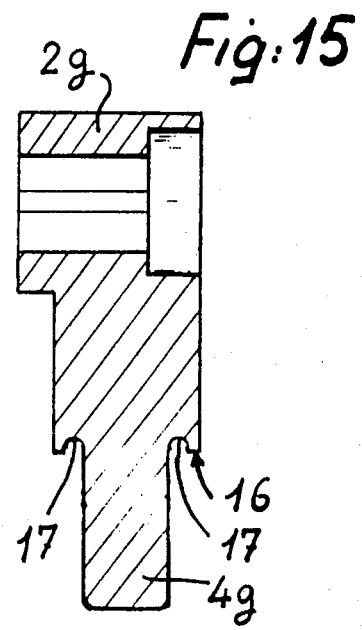
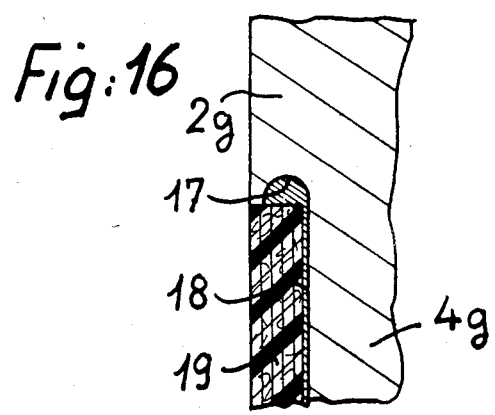

BICYCLE PEDAL CRANK

BACKGROUND OF THE INVENTION

1. Field of the Invention

The present invention relates to cranks for bicycle pedals.

2. Description of the Prior Art

At the present time, these pedal cranks are manufactured in a single piece of metal and formed in particular of light metal alloy. However, the very fact that they are intended to transmit large forces makes it necessary to design pedal cranks having suitable dimensions. Under these conditions, although they are made of light metal alloy, they still have a relatively substantial weight which constitutes a disadvantage for the equipment of racing bicycles.

With a view to reducing the weight of bicycle frames, it has already been proposed to replace the metal tubes usually employed for the construction of frames by tubular elements fabricated from synthetic resin reinforced with textile fabric as disclosed in European Pat. No. 127,553. However, a solution of this type cannot be adopted for pedal cranks by reason of the particular problems raised by the need to mount a pivoting pedal on one end of a crank and a crankshaft or so-called bottom bracket spindle on the other end of the crank.

Moreover, French Pat. No. 417,313 describes a pedal crank constituted by a number of die-stamped parts suitably welded together instead of being formed of a single forged part. However, this solution does not permit any reduction in weight since the components of the corresponding crank are all of die-stamped sheet metal including the crank arms and these components are integrally assembled by welding.

For the reasons given in the foregoing, the aim of this invention is to produce a bicycle pedal crank so designed as to afford a degree of mechanical strength equivalent to that of current designs while being of much lower weight.

SUMMARY OF THE INVENTION

The pedal crank in accordance with the invention is formed by the assembly of a number of separate elements as follows:

a crank arm consisting of an element of composite material formed by overmolding a synthetic resin on a tubular core of reinforcement fibers such as carbon fibers or aramide fibers, for example;

a first end-piece of metal or other suitable material which forms the hub of said crank;

if necessary a second end-piece which can be fixed on or within the opposite end of the tubular element in order to serve as a receiving member for the corresponding pedal.

It accordingly follows from the foregoing that, since the arm of the pedal crank under consideration is made of composite synthetic material, the crank is considerably reduced in weight while retaining excellent mechanical strength.

BRIEF DESCRIPTION OF THE DRAWINGS

FIG. 1 is a view in perspective of said pedal crank.
FIG. 2 is an axial sectional view of said crank.
FIG. 3 is a view in elevation showing the end-piece for receiving the corresponding pedal.
FIG. 4 is a fragmentary sectional view of an alternative embodiment of the same end-piece.
FIG. 5 is a sectional view in elevation showing another alternative embodiment.
FIG. 6 is an overhead plan view of the end-piece in accordance with the last-mentioned embodiment.
FIGS. 7, 8 and 9 are fragmentary vertical sectional views showing three alternative embodiments of the end-piece or reinforcement member which is intended to receive the corresponding pedal.
FIG. 10 is a schematic view in perspective showing another embodiment of the arm proper of the crank in accordance with the invention.
FIG. 11 is a view in front elevation showing a crank in accordance with the invention.
FIG. 12 is a view in side elevation of said crank.
FIG. 13 is a view in perspective showing the three elements to be assembled together so as to constitute the pedal crank.
FIG. 14 is a view in elevation showing the end-piece which forms the crank hub.
FIG. 15 is a sectional view taken along line XV—XV of FIG. 4.
FIG. 16 is a fragmentary sectional view at the point of junction between said end-piece and the crank arm.

DESCRIPTION OF THE PREFERRED EMBODIMENTS

The crank shown in FIGS. 1 to 6 is constituted by the assembly of three separate elements, namely a tubular element 1 constituting the arm of said crank and two end-pieces 2 and 3 forming respectively the hub of said crank and an end-piece for receiving the corresponding pedal.

The tubular element 1 is formed of composite synthetic material by overmolding of a synthetic resin on a tubular core of reinforcement fibers consisting, for example, of carbon fibers or aramide fibers such as those known by the trade name "Kevlar". The wall thickness of said tubular element and the orientation of the reinforcement fibers of this latter are determined so as to obtain a degree of mechanical strength as high as that of conventional cranks of light metal alloy. Furthermore, this tubular element is of considerably lighter weight by virtue of the very fact that it is formed of composite synthetic material.

The two end-pieces 2 and 3 are made separately of metal or any other suitable material. Each end-piece has a tenon 4 or 5 which can be engaged and fixed within the corresponding end of the tubular element 1. To this end, each tenon aforesaid is provided with a series of transverse grooves 6 forming cavities for a suitable adhesive which has the function of fixing the corresponding tenon in position.

In the case of a left pedal crank, the end-piece 2 which forms the crank hub has the shape illustrated in FIGS. 1 and 2. Said end-piece is therefore simply provided with a transverse opening 7 for forcible engagement on the corresponding end of a spindle. However, in the case of a right pedal crank, said end-piece 2 is capable of receiving the corresponding chain wheels or radial arms which are intended to serve as supports for one or a number of sprocket wheels.

The end-piece 3 is a separately-fitted component having an internally threaded bore 8 for receiving the corresponding pedal spindle.

As has already been mentioned, the chief advantage of the pedal crank under consideration lies in the reduction of its weight with respect to cranks of current types. A further advantage lies in the fact that the structure of this pedal crank is such that cranks having different lengths can readily be constructed by means of end-pieces 2 and 3 which are all identical with each other. It is in fact only necessary to manufacture a plurality of tubular elements 1 having different lengths.

However, the design of the pedal crank in accordance with the invention may be selected from a broad range of alternative forms of construction. Accordingly, FIG. 4 illustrates an alternative form of construction of the end-piece which is intended to receive the corresponding pedal. In this variant, a collar 9 is formed on the end-piece 3a so as to surround the corresponding end of the tubular element 1 which constitutes the crank arm. As in the previous embodiment, however, said end-piece is again provided with a tenon 5a which is intended to be forcibly inserted in the corresponding end of said tubular element. The presence of the collar 9 has the effect of enhancing the strength of the complete assembly and prevents delamination of the tubular element 1. Moreover, said collar facilitates centering at the time of assembly and subsequently protects the bonding adhesive against the effects of moisture. As will be readily apparent, the collar 9 can also be provided on the first end-piece 2 which constitutes the crank hub.

FIGS. 5 and 6 illustrate another alternative design of the end-piece for receiving the corresponding pedal. In this alternative form, the end-piece 3b is provided with a tenon 5b having a conical profile. However, the end of this tenon carries teeth 10 for centering the end-piece at the time of assembly. Moreover, these teeth have the function of ensuring uniform thickness of the layer of bonding adhesive.

FIG. 7 illustrates yet another alternative embodiment in which the end-piece for receiving the corresponding pedal is replaced by a metal insert 11 incorporated in the corresponding end of the tubular element 1c which forms the crank arm. This metal insert is disposed transversely and provided with an internally-threaded axial bore 12 in which the pedal spindle is intended to be fitted.

FIG. 8 illustrates a variant of this embodiment in which a metal insert 11d is again provided in the corresponding end of the crank arm 1d. However, provision is also made in this case for a reinforcement 13 of composite material within the corresponding end of said tubular element.

FIG. 9 illustrates a further alternative embodiment in which the receiving member of the crank consists of a metal reinforcement plug 11e which is forcibly inserted within the corresponding end of the tubular crank-arm element 1e. Said metal plug has an internally-threaded transverse bore 12e which has its opening on one side of the crank arm for receiving the spindle of the corresponding pedal.

Moreover, FIG. 10 illustrates an alternative embodiment of the tubular element which forms the crank arm. In this alternative embodiment, said element is constituted by two complementary parts 1f which are fabricated separately and then assembled against each other along a joint plane X-Y, a channel being provided in the internal face of each part. These parts are formed of composite material consisting of fibers which may or may not be woven and a suitable impregnating resin. It can be understood that the crank arm as thus constituted then receives end-pieces or reinforcement members which are intended respectively to constitute the crank hub and to serve as a receiving and fixing element for the corresponding pedal.

FIGS. 11 to 16 illustrate yet another embodiment of the pedal crank in accordance with the invention. In this design, the crank arm is again formed of composite synthetic material by overmolding of a synthetic resin on a tubular core of reinforcement fibers consisting, for example, of carbon fibers or aramide fibers such as those known by the trade name "Kevlar". This element preferably has an oval cross-section.

In this particular embodiment, the ends of said tubular element 1g extend obliquely with respect to the axis Z-Z' of said element. In fact, each end 14 or 15 of said element forms an angle $\alpha$, for example 45°, with respect to the axis Z-Z'.

The crank arm 1g is adapted to carry two end-pieces 2g and 3g, the first being intended to constitute the crank hub whilst the second is intended to receive the spindle of a pedal. These two parts are formed separately of metal or any other suitable material. Each part has a tenon 4g or 5g which can be engaged and fixed within the corresponding end of the tubular element 1g.

At the base of each fixing tenon 4g or 5g, each end-piece 2g or 3g has a shouldered portion 16 which extends obliquely with respect to the axis Z-Z' of the crank arm at the same angle of slope as the ends 14 and 15 of said arm. Thus, each end-piece shoulder is applied in close contact with the corresponding end 14 or 15 of the tubular element 1g when the fixing tenon of each end-piece is engaged within the corresponding end of said tubular element.

The free end of each tenon 4g or 5g can extend obliquely with respect to the axis Z-Z' as shown in FIG. 4 in the case of the tenon 4g. This corresponds to a constant bonding surface between each tenon and the corresponding end of the crank arm 1g. However, the free end of each tenon can also extend at right angles with respect to the axis Z-Z' as represented by the chain-dotted line 19 in FIG. 14. If so required, the first of these two shapes (oblique end) can be provided on the tenon 5g of the end-piece which is intended to receive the pedal and the other shape (right-angled end) can be provided on the tenon 4g of the other end-piece.

The oblique arrangement of the contact surfaces between each end of the tubular element 1g and the bearing shoulder of the corresponding end-piece has the effect of increasing the cross-sectional area of these surfaces and consequently the mechanical strength of the corresponding connections. Thus, with an angle of slope of 45°, the contact surfaces can have approximately twice the area of those existing in the case of a right-angle cut of the ends of the tubular element 1g. In regard to the moment of inertia with respect to the minor axis of the oval cross-section of the tubular element 1g, its value can be four times higher in such a case.

In order to strengthen the connection between the tubular element 1g and the two end-pieces to an even greater extent, a groove 17 can advantageously be provided in that portion of each shoulder 16 which is adjacent to the external surface of the corresponding fixing tenon 4g or 5g (as shown in FIGS. 15 and 16). This groove has the advantage of removing any danger of incipient rupture at the point of connection between the fixing tenon and the body of the corresponding end-piece.

A further advantage of the above-mentioned groove lies in the fact that the adhesive used for fixing the tenon of each end-piece within the tubular element 1g is prevented by the groove from seeping to the exterior. In fact, should there be any excess quantity in the film of adhesive 18 which is present between a fixing tenon and the internal wall of the tubular element 1g, this excess quantity is permitted to flow into the corresponding groove 17 and is retained by this latter, thereby effectively forestalling any danger of seepage to the exterior.

However, the examples described in the foregoing have been given solely by way of indication and other alternative forms of construction of the pedal crank in accordance with the invention may accordingly be contemplated.

What is claimed is:

1. A bicycle pedal crank comprising a hollow fiber reinforced synthetic resin tubular crank arm having first and second end pieces at opposite ends thereof, each end piece having a fixing tenon thereon that fits into the associated end of the hollow crank arm and a shoulder surrounding the tenon which extends obliquely with respect to the axis of the crank arm, the crank arm having at each end an oblique end surface disposed obliquely to the axis of the crank arm at the same angle of slope as the shoulder of the corresponding end piece, and means bonding together the crank arm and the first and second end-pieces.

2. A bicycle pedal crank as claimed in claim 1, said first and second end pieces being of metal and said securing means being an adhesive that extends between said shoulders on said end-pieces and said ends of said crank arm.

3. A bicycle pedal crank as claimed in claim 1, there being a groove in each said shoulder on each said end piece on the side of the shoulder adjacent the tenon of each end-piece, and a quantity of adhesive in each said groove.

* * * * *